United States Patent [19]

Mondshine et al.

[11] 3,726,271
[45] Apr. 10, 1973

[54] SPIROMETER WITH AUTOMATIC ELECTRONIC ZEROING CIRCUIT

[75] Inventors: William G. Mondshine; Charles D. Bishop, both of Houston, Tex.

[73] Assignee: Cardio-Pulmonary Instrument Corporation, Houston, Tex.

[22] Filed: July 2, 1970

[21] Appl. No.: 51,906

[52] U.S. Cl. .................128/2.08, 73/194 E, 330/85
[51] Int. Cl. .................................................A61b 5/08
[58] Field of Search .................128/2.08, 2.05 F, 128/2.06 B; 73/194 E, 195; 330/85

[56] References Cited

UNITED STATES PATENTS

| | | | |
|---|---|---|---|
| 3,045,666 | 7/1962 | Dubsky et al. | 128/2.08 |
| 3,232,288 | 2/1966 | Krobath | 128/2.08 |
| 3,237,116 | 2/1966 | Skinner et al. | 330/85 X |
| 3,347,223 | 10/1967 | Pacela | 128/2.08 X |
| 3,410,264 | 11/1968 | Frederik | 128/2.08 X |
| 3,498,288 | 3/1970 | Max et al. | 128/2.06 B |
| 3,511,237 | 5/1970 | Jaeger | 128/2.08 |
| 3,516,399 | 6/1970 | Barefoot | 128/2.05 F |
| 3,577,984 | 5/1971 | Levy | 128/2.08 |
| 3,580,243 | 5/1971 | Johnson | 128/2.06 B |

FOREIGN PATENTS OR APPLICATIONS 1,508,303  11/1967  France .................128/2.08

OTHER PUBLICATIONS

Bartlett, R. G., et al., Journ. of Applied Physiology, Vol. 14, (1959) pp. 89-96.

*Primary Examiner*—Kyle L. Howell
*Attorney*—Arthur Schwartz

[57] ABSTRACT

A pulmonary function measuring system incorporating an automatic electronic zeroing circuit to provide accurate pulmonary measurements irrespective of any initial offset value. The system eliminates tedious and inaccurate manual calibration and is adapted for use in air volume, pressure and flow measurements such as in spirometric-plethysmographic systems.

4 Claims, 7 Drawing Figures

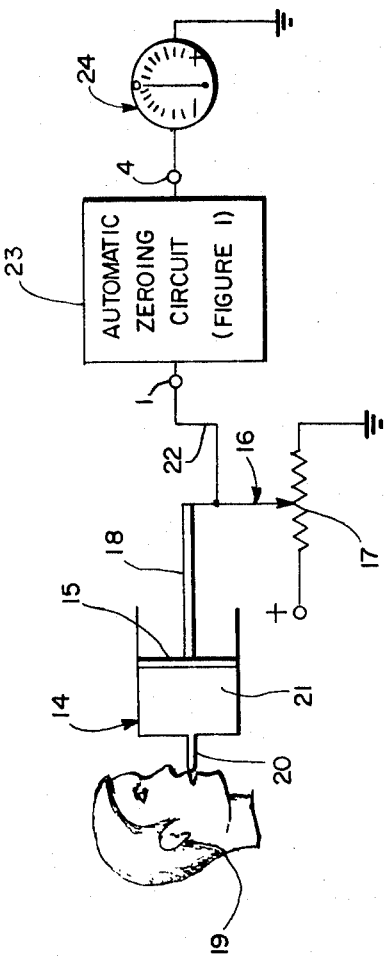
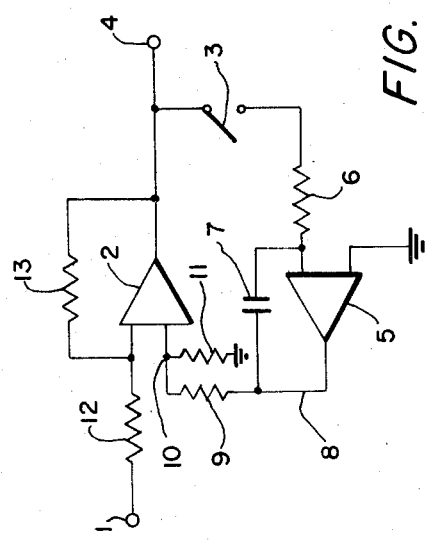
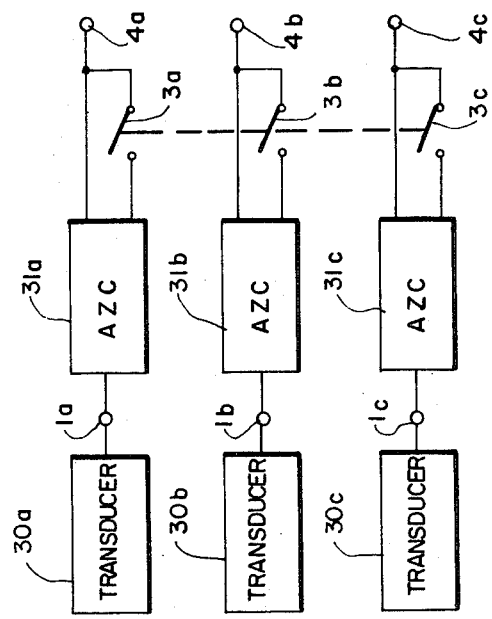
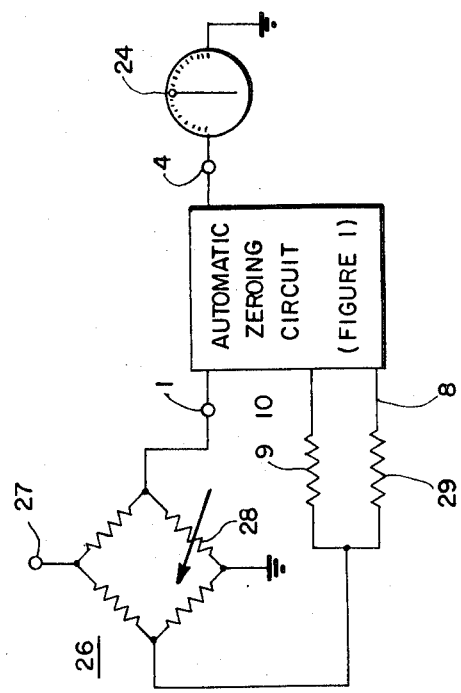
INVENTORS
WILLIAM G. MONDSHINE
CHARLES D. BISHOP
BY Arthur Schwartz
ATTORNEY

SPIROMETER WITH AUTOMATIC ELECTRONIC ZEROING CIRCUIT

SUMMARY OF THE INVENTION

The circuit of the invention measures the change in a parameter without regard to any initial value of the parameter prior to the change. An amplifier circuit is provided with a feedback control to zero the output of the amplifier for any initial voltage. The feedback circuit stores the initial voltage to continue control after the initial voltage is disconnected from the amplifier output.

The invention is particularly applicable to a spirometer or volume-measuring device which is automatically calibrated to zero, thereby eliminating the requirement for tedious and sometimes inaccurate manual calibration. The circuit can also be used to provide strain gage transducers and other bridge circuits with automatic balance, or for simultaneous balancing or zeroing of plural circuits such as pressure and flow transducers. The circuit of the invention can be used to provide improved plethysmograph systems for use in lung studies, and for an improved peak-to-peak detector for general use. The device also provides an improved circuit for respiratory resistance measurement in lung studies.

BRIEF DESCRIPTION OF THE DRAWINGS

FIG. 1 is a block diagram of an automatic electronic zeroing circuit (AZO) according to the invention.

FIG. 2 is a schematic illustration of the AZC circuit of FIG. 1 as used in a spirometer medical instrument.

FIG. 3 is a schematic diagram of the AZC circuit of FIG. 1 as used with a bridge or strain gage circuit.

FIG. 4 is a schematic block diagram of AZC circuits connected to multiple transducers for simultaneous zeroing of a plurality of outputs.

DESCRIPTION OF THE PREFERRED EMBODIMENTS

Figure 5:
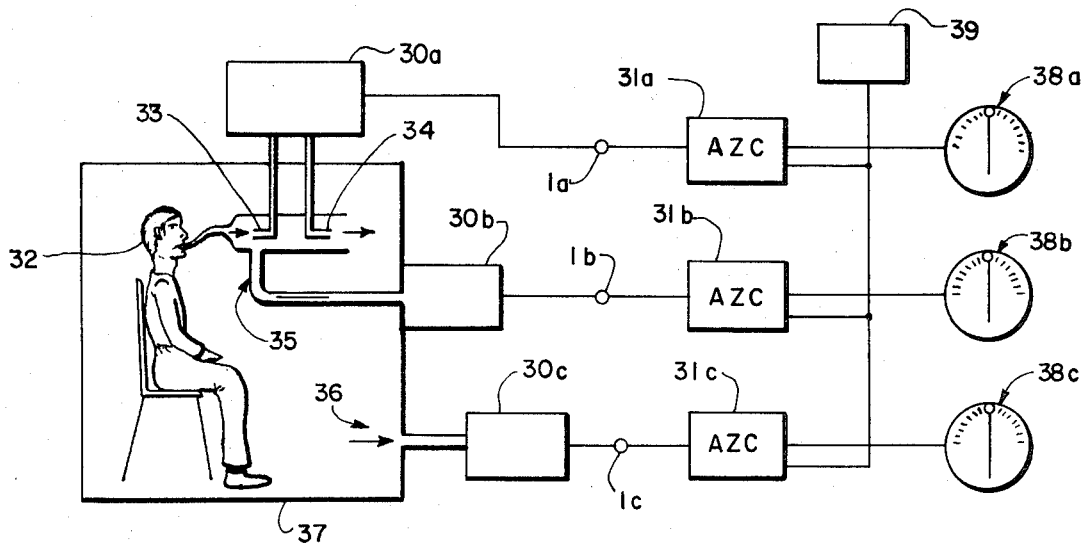
FIG. 5 is a schematic diagram illustrating the use of AZC circuits simultaneously to zero multiple transducers in a plethysmograph system.

Referring to FIG. 1, assume that an initial voltage offset appears at an input 1 of a DC coupled differential amplifier 2. With a feedback switch 3 closed, the output terminal 4 of amplifier 2 is connected to the input of an integrating amplifier 5 through an input resistor 6. A feedback capacitor 7 i provided to cause amplifier 5 to integrate. An integrator output terminal 8 is connected through an input resistor 9 to the non-inverting input 10 of amplifier 2. A gain-setting resistor 11 is also connected to input terminal 10. The integrator output will increase (or decrease) until the voltage on output terminal 4 is reduced to zero, thereby compensating for initial voltage offset. Switch 3 may then be opened to isolate the integrator from the output terminal 4. Capacitor 7 will retain the initial offset voltage charge. Amplifier 5 continues to hold a fixed voltage at terminal 8, thereby zeroing the voltage on terminal 4. Amplifier 2 is provided with an input resistor 12 and a feedback resistor 13 to control its forward gain.

The resistors 9, 11, 12 and 13 are the gain-setting resistors common to this type of circuitry. Resistor 6 and capacitor 7 establish the time constant of the integrator. The integrating amplifier 5 draws no appreciable current from the capacitor and may be a low bias-current field-effect transistor (FET) operational-amplifier. When changes in a parameter are to be measured and the initial value of the parameter is not always zero, the circuit illustrated in FIG. 1 can be used. The circuit in FIG. 1 will give a zero output at terminal 4 for any initial voltage applied at the input terminal 1. When switch 3 is opened, any subsequent changes from the initial value at input terminal 1 will be amplified by amplifier 2 and made available at output terminal 4 for easy measurement.

The circuit of FIG. 1 is shown connected to a spirometer in FIG. 2. A spirometer is a volume measuring device used in lung studies. The volume measuring device as illustrated consists of a cylinder 14 with a moving piston 15 connected to a sliding tap 16 of a potentiometer 17 by a connecting link 18. A patient 19 can inhale or exhale into a mouthpiece 20 to change the volume of air 21 in the cylinder. Such change is measured by means of the potentiometer and is applied via a lead 22 to the AZC 23 to be registered on a meter 24.

The piston 15 is started at a position other than 0 (e.g. mid-scale). Switch 3 is closed to zero the circuit. The AZC circuit will cause the meter 24 to read 0, thereby establishing the initial starting point. Switch 3 is opened, after which the patient can inhale or exhale, whereby changes in volume from the initial starting point are easily measured on the meter 24.

Bridge circuits are common in measuring instruments. Their main disadvantage is that they require balancing before use. FIG. 3 shows one form of bridge circuit which is automatically balanced by use of the AZC. It should be understood that the AZC will be applicable to other forms of bridge circuits. A resistance bridge 26 with voltage applied at a terminal 27 has a variable resistance leg 28. The bridge circuit is connected to the AZC and amplifier 2 acts as the bridge amplifier. When switch 3 is closed, the bridge amplifier 2 is automatically balanced. After switch 3 is opened, changes in resistor 28 from the initial starting point are easily measured. A resistor 29 has been added to the circuit of FIG. 1 and serves to isolate the integrator from the bridge.

Bridge circuits have numerous forms and applications. Their use is common in strain gage transducers to measure pressure. Often in such systems, pressures are monitored simultaneously in several channels. By using the circuit of FIG. 3 in each channel, and by operating the zeroing switches in all channels at the same time, all channels can be balanced simultaneously and automatically just prior to testing. FIG. 4 illustrates a three channel zeroing system in which three transducers 30a, 30b and 30c provide signals respectively to input terminals 1a, 1b and 1c of AZC circuits 31a, 31b and 31c. Switches 3a, 3b and 3c are ganged respectively to zero AZC circuits 31a, 31b and 31c to provide zeroed outputs respectively to output terminals 4a, 4b and 4c.

Referring to FIG. 5, a medical patient 32 is being studied by use of a plethysmograph, a system to measure pressure and flow of air in lung studies. The multi-channel system of FIG. 4 is used in the plethysmograph system of FIG. 5.

One of the measurements made in plethysmograph studies is the rate of flow as the patient exhales. This is done with a pneumotach 30a, which is a flow volume transducer for sensing differential pressure between two pitot tubes 33 and 34 in a known manner. A differential pressure transducer, which is included in transducer 30a, requires balancing as described above. This is accomplished by the AZC circuit 31a connected to the pneumotach 30a via input terminal 1a.

Two other measurements may be made in plethysmograph studies. One is mouth pressure measured via a tube 35 to a pressure transducer 30b connected to an AZC 31b via input terminal 1b. The other measurement is pressure at point 36 inside an enclosure 37, commonly called the body box, which is measured by pressure transducer 30c connected to AZC 31c via input terminal 1c.

Each channel is connected to an indicator of some form, illustrated respectively as meters 38a, 38b and 38c. All channels are zeroed simultaneously by a device 39 which operates ganged switches 3a, 3b and 3c in the respective AZC circuits. The device 39 may be actuated manually or automatically. By use of the AZC's and simultaneously zeroing the plethysmograph channels, measurements are all started under the same conditions.

Figure 6:
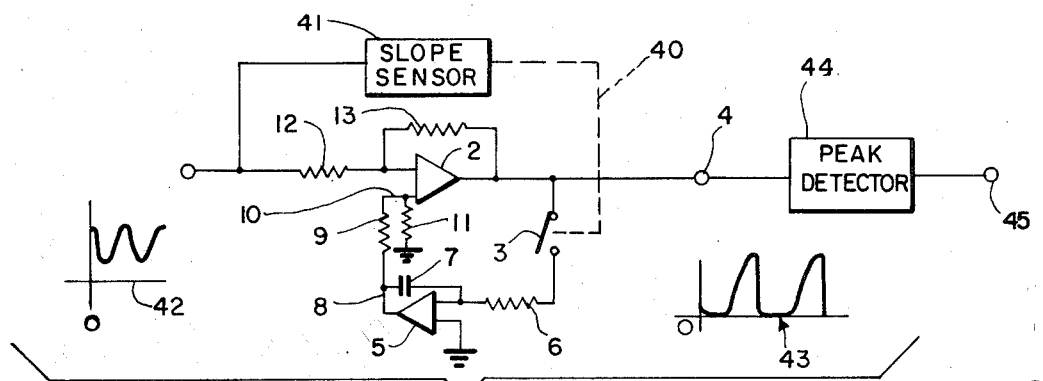
FIG. 6 is a schematic block diagram of an AZC circuit used with a peak detector system.

The circuit shown in FIG. 6 is an adaptation of the AZC circuit of FIG. 1 for reading the peak-to-peak value of a wave form applied to the input terminal 1. Switch 3 is operated by a relay which closes at the peak of the input wave form and opens at the bottom of the wave form. The switch is actuated via a connection 40 by the slope sensor relay 41 shown in block form for simplicity. When switch 3 closes, the output terminal 4 will track zero for the portion of the wave form from the peak to the bottom. There will be some delay due to the time constant of the integrator, which can be adjusted as required. At the bottom of the input wave form 42, the slope sensor 41 causes switch 3 to open whereby the voltage on output terminal 4 will follow the input wave form from the bottom to the peak, resulting in an output wave form 43. The output terminal 4 is connected to a peak detecting circuit 44 to generate at output terminal 45 a DC level equal to the peak-to-peak value of the input wave form.

Figure 7:
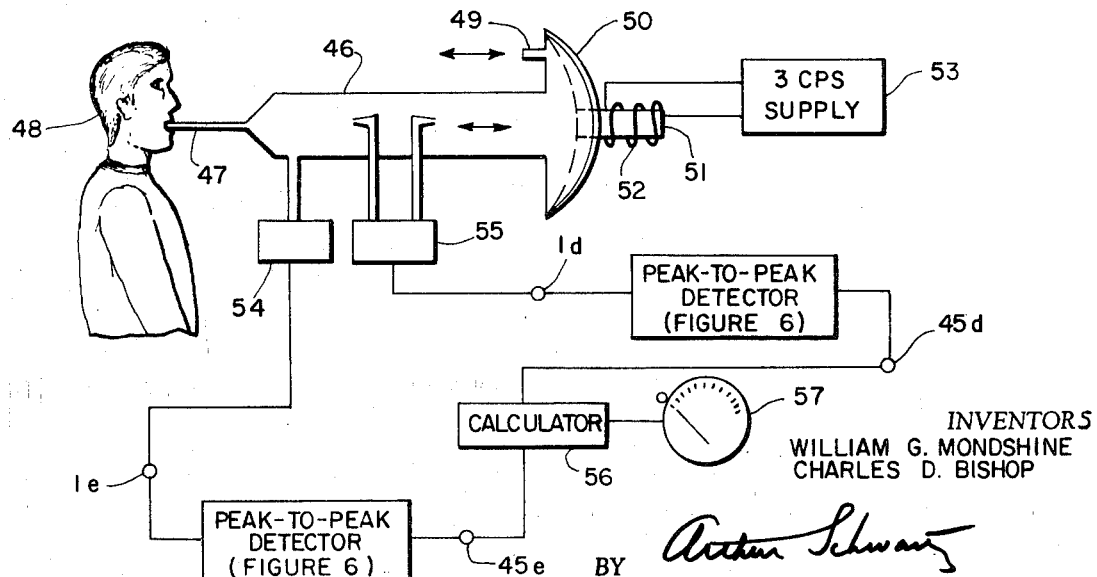
FIG. 7 is a schematic illustration of the use of AZC circuits with peak circuits in a respiratory resistance measurement system.

FIG. 7 illustrates a system to measure the respiratory resistance of the lungs and associated tubes of medical patients. The peak-to-peak detector circuit of FIG. 6 is used in the system. In the system, a tube 46 has a mouthpiece 47 at one end for the patient 48. At the other end of the tube there is a vent 49 to allow the patient to breath. A moveable diaphragm 50 is attached to a core 51 around which is would a coil 52. The coil is driven by a low frequency source 53, preferably 3 cps, and the combination of elements 50, 51 and 52 acts like a speaker to oscillate air in the tube and in the patient's lungs. The respiratory resistance may be calculated if the peak-to-peak pressure and flow are known. A pressure transducer 54 and a pneumotach 55 (for flow measurement), each including an AZC, and each operating as described in connection with FIG. 5, are attached to the tube.

The peak-to-peak detector circuit in each channel is that shown in FIG. 6. The signal from each detector is fed into a calculator 56 which computes respiratory resistance from the formula resistance equals pressure divided by flow. Analog dividers capable of being used as calculator 56 are well known.

An indicator 57 shows the calculated value for respiratory resistance. The peak-to-peak detection is instantaneous and does not require more than one cycle for accurate readings. In addition the input wave form can have a DC offset from zero and the system will still function properly.

We claim:

1. A device for measuring respiratory resistance of a respiratory system comprising:
   a. a tube for connection to said respiratory system,
   b. means for impressing forced oscillatory air movement into said tube,
   c. transducer means connected to said tube for measuring the pressure and flow of oscillatory air movement in the tube and for generating first and second electrical signals, respectively indicative of said pressure and flow, said signals having a possible initial offset value,
   d. switch-controlled automatic zeroing circuit means for receiving said first and second electrical signals and for generating third and fourth electrical signals compensated for the initial offset value,
   e. slope-sensing means for receiving said first and second electrical signals, and for detecting, by changes in slope, when said signals reach maxima and minima values, said slope sensing means adapted to actuate said switch-controlled automatic zeroing circuit means upon detecting a maximum value and to deactuate said switch-controlled automatic zeroing circuit means upon detecting a minimum value,
   f. peak detector means connected to receive said third and fourth compensated electrical signals for generating fifth and sixth electrical signals indicative of the peak-to-peak values of said third and fourth compensated electrical signals, and
   g. computin means responsive to said fifth and sixth signals for calculating respiratory resistance.

2. A device for measuring respiratory resistance of a respiratory system as recited in claim 1 wherein said switch-controlled automatic zeroing circuit means comprises:
   a. a differential amplifier having an inverting input terminal, a non-inverting input terminal, and an output terminal;
   b. a feedback circuit including an operational amplifier having an input connection point and an output connection point and further including a capacitor connected between said input connection point and said output connection point, said operational amplifier and said capacitor functioning as an integrator, said output connection point being electrically connected to said non-inverting input terminal; and
   c. switch means for selectively, electrically connecting and disconnecting said output terminal and said input connection point for causing said integrator to zero said differential amplifier in order to compensate said initial offset value on said inverting input terminal when said switch means is in its connecting mode and in order to hold the compensation for said initial offset value when said switch means is in its disconnecting mode.

3. A device for measuring respiratory resistance of a respiratory system as recited in claim 1, further comprising indication means connected to said computing means for indicating the calculated respiratory resistance.

4. A device for measuring respiratory resistance of a respiratory system as recited in claim 3, wherein said indication means comprises a meter.

* * * * *